United States Patent
Kala et al.

(10) Patent No.: US 12,040,830 B2
(45) Date of Patent: Jul. 16, 2024

(54) ADAPTIVE FREQUENCY HOPPING IN A WIRELESS BATTERY MANAGEMENT SYSTEM

(71) Applicant: TEXAS INSTRUMENTS INCORPORATED, Dallas, TX (US)

(72) Inventors: Naveen Kumar Kala, Austin, TX (US); Ariton Xhafa, Plano, TX (US); Tariq Muhanna, Garland, TX (US); Mathew Giaramita, New York, NY (US)

(73) Assignee: Texas Instruments Incorporated, Dallas, TX (US)

( * ) Notice: Subject to any disclaimer, the term of this patent is extended or adjusted under 35 U.S.C. 154(b) by 25 days.

(21) Appl. No.: 17/898,614

(22) Filed: Aug. 30, 2022

(65) Prior Publication Data
US 2024/0072841 A1    Feb. 29, 2024

(51) Int. Cl.
| | |
|---|---|
| H04B 1/713 | (2011.01) |
| H04L 1/1607 | (2023.01) |
| H04W 72/0453 | (2023.01) |
| H04W 72/23 | (2023.01) |

(52) U.S. Cl.
CPC ........... *H04B 1/713* (2013.01); *H04L 1/1614* (2013.01); *H04W 72/0453* (2013.01); *H04W 72/23* (2023.01)

(58) Field of Classification Search
CPC ... H04B 1/713; H04W 72/0453; H04L 1/1614
See application file for complete search history.

(56) References Cited

U.S. PATENT DOCUMENTS

| | | | | |
|---|---|---|---|---|
| 8,457,552 B1 * | 6/2013 | Linsky | ................. | H04W 76/11 455/517 |
| 10,244,532 B2 * | 3/2019 | Taylor | ...................... | H04Q 9/04 |
| 2007/0066227 A1 * | 3/2007 | Duerdodt | ............ | H04W 56/009 455/63.1 |
| 2008/0107156 A1 * | 5/2008 | Wentick | ................. | H04B 1/713 375/E1.034 |
| 2018/0269925 A1 * | 9/2018 | Matsuo | ................... | H04B 1/713 |
| 2019/0254015 A1 * | 8/2019 | Chang | ................... | H04W 72/20 |
| 2020/0220682 A1 * | 7/2020 | Li | .......................... | H04W 48/16 |
| 2021/0274485 A1 * | 9/2021 | Choi | ..................... | H04L 5/0053 |
| 2021/0321413 A1 * | 10/2021 | Shin | ....................... | H04W 72/23 |

* cited by examiner

*Primary Examiner* — Jaison Joseph
(74) *Attorney, Agent, or Firm* — Carl G. Peterson; Frank D. Cimino

(57) ABSTRACT

A method for channel switching by a secondary node. The method includes: receiving, from a primary node, a downlink transmission, measuring one or more statistics about the downlink transmission, determining, from the downlink transmission, an uplink interval, transmitting, to the primary node during the uplink interval, the measured one or more statistics about the downlink transmission, receiving, from the primary node, an indication of a set of useable channels, determining, based on the set of useable channels and at least one of the primary node or the secondary node, a next channel from the set of useable channels, and switching to the next channel based on a switch indication from the primary node.

20 Claims, 7 Drawing Sheets

ADAPTIVE FREQUENCY HOPPING IN A WIRELESS BATTERY MANAGEMENT SYSTEM

BACKGROUND

Increasingly, battery packs are being integrated into systems which traditionally were not powered by batteries, such as cars, houses, and even parts of the electrical grid. In parallel to becoming more common, battery packs are getting larger and more complex. For example, modern battery packs can be made of hundreds or thousands of battery cells. These battery cells may include complex chemistries which need to be kept in balance to extend battery performance and life. Thus, techniques for monitoring and controlling the battery cells of a battery pack may be useful.

SUMMARY

In one example, a method for channel switching by a secondary node. The method includes: receiving, from a primary node, a downlink transmission, measuring one or more statistics about the downlink transmission, determining, from the downlink transmission, an uplink interval, transmitting, to the primary node during the uplink interval, the measured one or more statistics about the downlink transmission, receiving, from the primary node, an indication of a set of useable channels, determining, based on the set of useable channels and at least one of the primary node or the secondary node, a next channel from the set of useable channels, and switching to the next channel based on a switch indication from the primary node.

In another example, a non-transitory program storage device includes instructions stored thereon to cause one or more processors of a primary node to transmit, to a set of secondary nodes, a downlink transmission. The downlink transmission includes an indication of an uplink intervals for secondary nodes of the set of secondary nodes. The one or more processors also are configured to receive uplink transmissions from the secondary nodes of the set of secondary nodes, the uplink transmissions including one or more statistics about the downlink transmission, measure one or more statistics about the uplink transmissions, generate, based on the one or more statistics about the downlink transmission and the measured one or more statistics about the uplink transmission, a set of useable channels, transmit, to a set of secondary nodes, an indication of the set of useable channels, determine, based on an identifier and the set of useable channels, a next channel from the set of useable channels, transmit a switch indication to the set of secondary nodes, and switch to the next channel.

In yet another example, a system for channel switching by a wireless network includes a plurality of secondary nodes and a primary node wirelessly coupled to the plurality of secondary nodes. The primary node is configured to: transmit, to the plurality of secondary nodes, a downlink transmission, the downlink transmission including an indication of an uplink intervals for secondary nodes of the plurality of secondary nodes, receive uplink transmissions from the plurality of secondary nodes, the uplink transmissions including one or more statistics about the downlink transmission, measure one or more statistics about the uplink transmissions, generate, based on the one or more statistics about the downlink transmission and the measured one or more statistics about the uplink transmission, a set of useable channels, transmit, to the plurality of secondary nodes, an indication of the set of useable channels, determine, based on an identifier and the set of useable channels, a next channel from the set of useable channels, transmit a switch indication to the plurality of secondary nodes, and switch to the next channel. Each secondary node of the plurality of secondary nodes is configured to: receive, from the primary node, a downlink transmission, measure the one or more statistics about the downlink transmission, determine, from the received downlink transmission, an uplink interval, transmit, to the primary node during the uplink interval, the measured one or more statistics about the downlink transmission, receive, from the primary node, an indication of a set of useable channels, determine, based on an identifier and the set of useable channels, a next channel from the set of useable channels, and switch to the next channel based on a switch indication from the primary node.

BRIEF DESCRIPTION OF THE DRAWINGS

For a detailed description of various examples, reference will now be made to the accompanying drawings in which.

The same reference numbers or other reference designators are used in the drawings to designate the same or similar (either by function and/or structure) features.

DETAILED DESCRIPTION

Battery packs may include multiple components to help monitor the battery cells of the battery pack. Monitoring the battery cells for information such as voltage, current, temperature, register settings, etc., helps to ensure the health and functionality of the overall battery system. For example, battery cells can vary in capacities and rates of discharge (and/or charge) from cell to cell. This cell-to-cell variations can result in imbalances in the state of charge between battery cells. Balancing voltages across the battery cells may be performed to distribute the load (and/or power) between different battery cells to help improve the available capacity of the overall battery pack and increase battery cell life. This monitoring and controlling of the battery cells may be performed by a battery management system.

Figure 1:
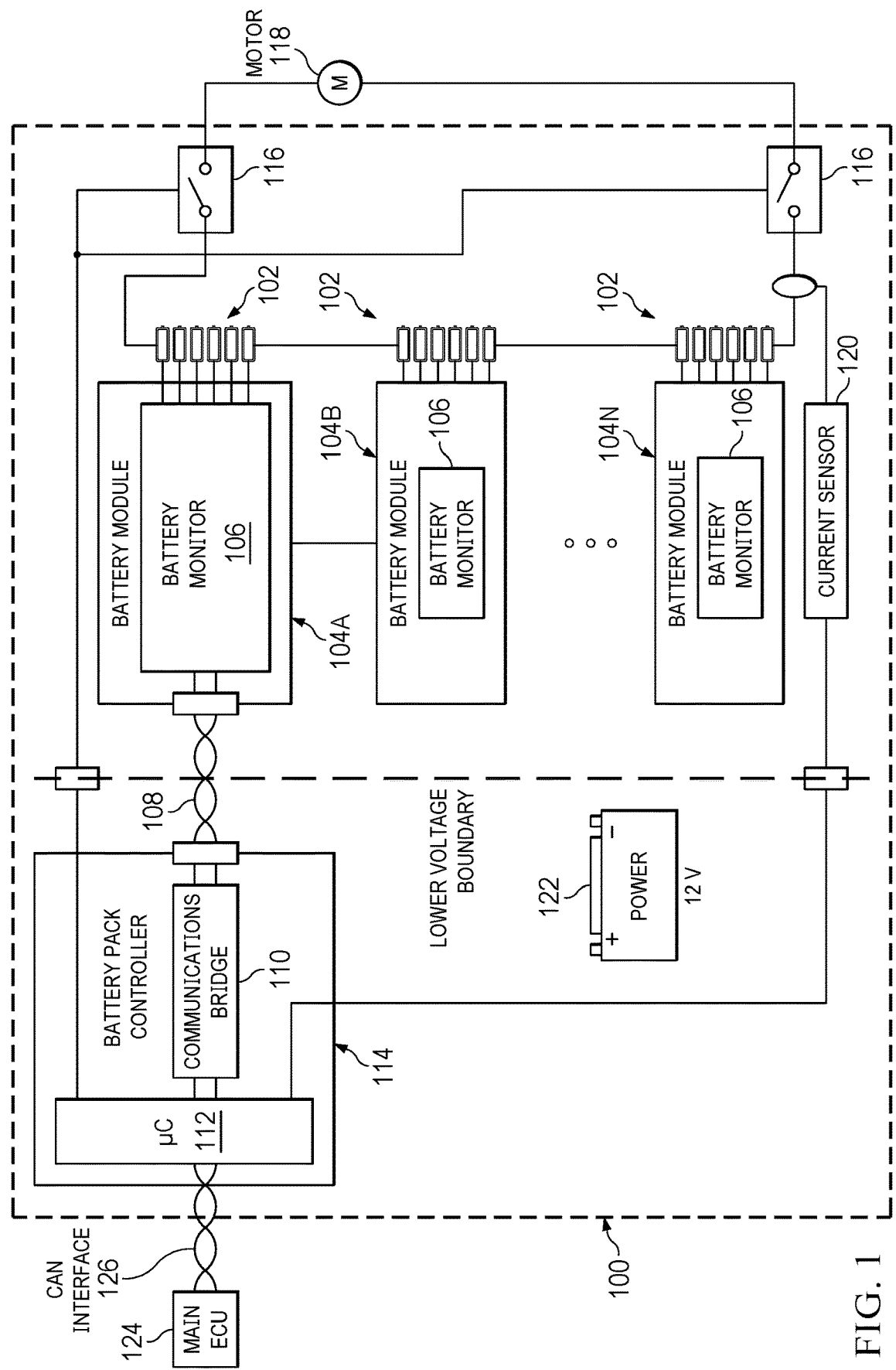
FIG. 1 is a block diagram illustrating a battery management system, in accordance with aspects of the present disclosure.

FIG. 1 is a block diagram illustrating a battery management system 100, in accordance with aspects of the present disclosure. The battery management system 100 monitors and controls a set of battery cells 102. The collection of battery cells represents the battery pack. These battery cells 102 may be organized into battery modules 104A-104N. In this example, each battery module 104A-104N couples to or includes six battery cells 102, but it should be understood that the battery modules 104A-104N may include any number of battery cells 102 and the number of battery cells 102 per battery module 104A-104N may vary. In this example, each of the battery modules 104A-104N includes a battery monitor 106 which includes an analog front-end coupled to the respective battery cells 102 to measure and collect information about such battery cells 102. The battery monitor 106 is coupled to a communications bridge 110 of a battery pack controller 114 via a network connection 108. The communications bridge 110 is coupled to a microcontroller 112 of the battery pack controller 114.

Each battery monitor 106 collects and digitizes the information about its battery cells 102 and transmits the digital information through, for example, battery module 104A via the network connection 108 and the communications bridge 110 to the microcontroller 112 of a battery pack controller 114. The microcontroller 114 may also be coupled to switches 116 that couple the battery cells 102 to one or more motors 118 or other load devices. The microcontroller 114 may also be coupled to one or more other sensors, such as a current sensor 120, which may monitor an overall current being supplied to the motor 118. In this example, the battery pack controller 114 is powered by a separate battery 122 from the battery pack. In this example, the microcontroller 112 is coupled to a main ECU 124 via, for example, a car area network interface 126.

Typically, the battery monitor 106 is wired to the battery pack controller 114. To help reduce battery pack size, maintenance, cost, and complexity, the wired connection between the battery monitor 106 and the battery controller 114 may be replaced by a wireless connection. As wireless connections can experience interference from other wireless devices and a technique for adaptive frequency hopping for WBMS may be useful.

Figure 2:
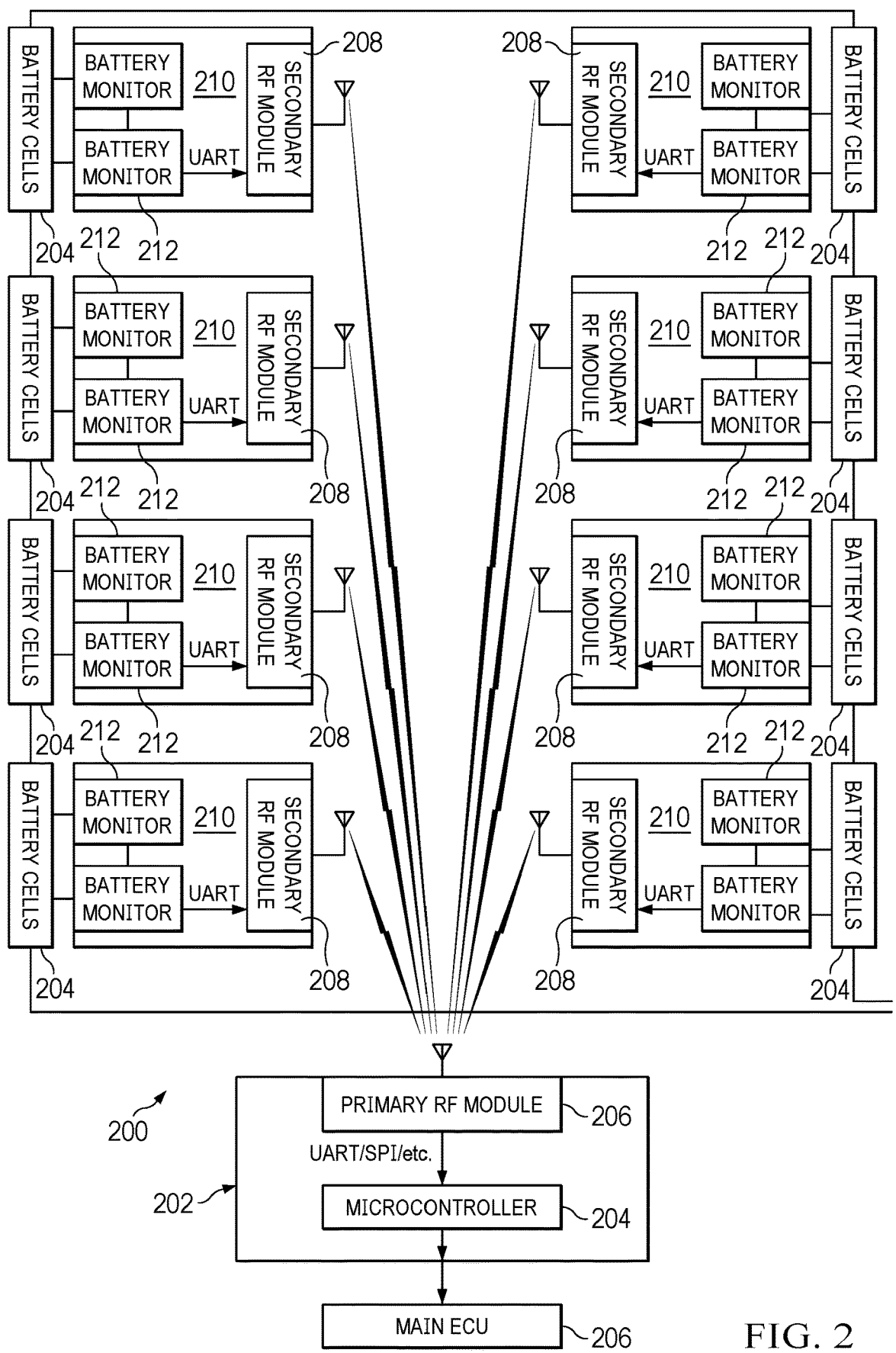
FIG. 2 is a block diagram illustrating a wireless battery management systems (WBMS), in accordance with aspects of the present disclosure.

FIG. 2 is a block diagram illustrating a WBMS 200, in accordance with aspects of the present disclosure. The WBMS 200 includes a primary node 202 that functions in a way similar to the battery pack controller 114. The primary node 202 includes a microcontroller 204 which is coupled to the main ECU 206, via, for example, a controller area network (CAN) interface. The microcontroller 204 may operate in a substantially similar way as microcontroller 114. The microcontroller 204 is coupled to a primary radio frequency (RF) module 206 via a digital communication interface such as a universal asynchronous receiver-transmitter (UART) interface, serial peripheral interface (SPI), etc. The primary RF module 206 is coupled via a wireless connection over a wireless medium to one or more secondary RF modules 208 associate with one or more secondary nodes 210. The secondary nodes 210 each include a secondary RF module 208 for communicating with the primary node 202. The secondary RF module 208, of a secondary node 210, is coupled to one or more battery monitors 212 via a digital communication interface such as a UART interface, SPI, etc. As shown in this example, secondary nodes 210 may include multiple battery monitors 212.

The battery monitors 212 may be similar to battery monitors 106 and include analog front ends coupled to the battery cells 204 to measure and collect information about the battery cells 204. This information may be sent, via the digital communication interface, to the secondary RF module 208 of the secondary node 210. The secondary RF module 208 of the secondary node 210 then wirelessly transmits the information to the primary node 202. In some cases, this wireless transmission may be performed according to a wireless battery management protocol, such as a WBMS protocol.

The wireless battery management protocol may define a set of wireless channels along with a set of rules for how information may be transmitted wirelessly for monitoring and managing the battery pack. In some cases, the wireless battery management protocol may utilize unlicensed frequency bands such as the 2.4 GHz, 5.8 GHz, etc. bands. Generally, a frequency band, such as the 2.4 GHz unlicensed frequency band, can be divided into a set of channels where each channel includes a set of frequency resources within a certain set of frequencies. The number of channels and the size of the channels may be determined based on the protocol. For example, the WBMS protocol may divide the 2.4 GHz unlicensed frequency band into a set of 40 channels where each channel is 2 MHz wide. As another example, certain 802.11 wireless networks may divide the same 2.4 GHz unlicensed frequency band into a set of 11 channels where each channel is 20 MHz wide.

Figure 3:
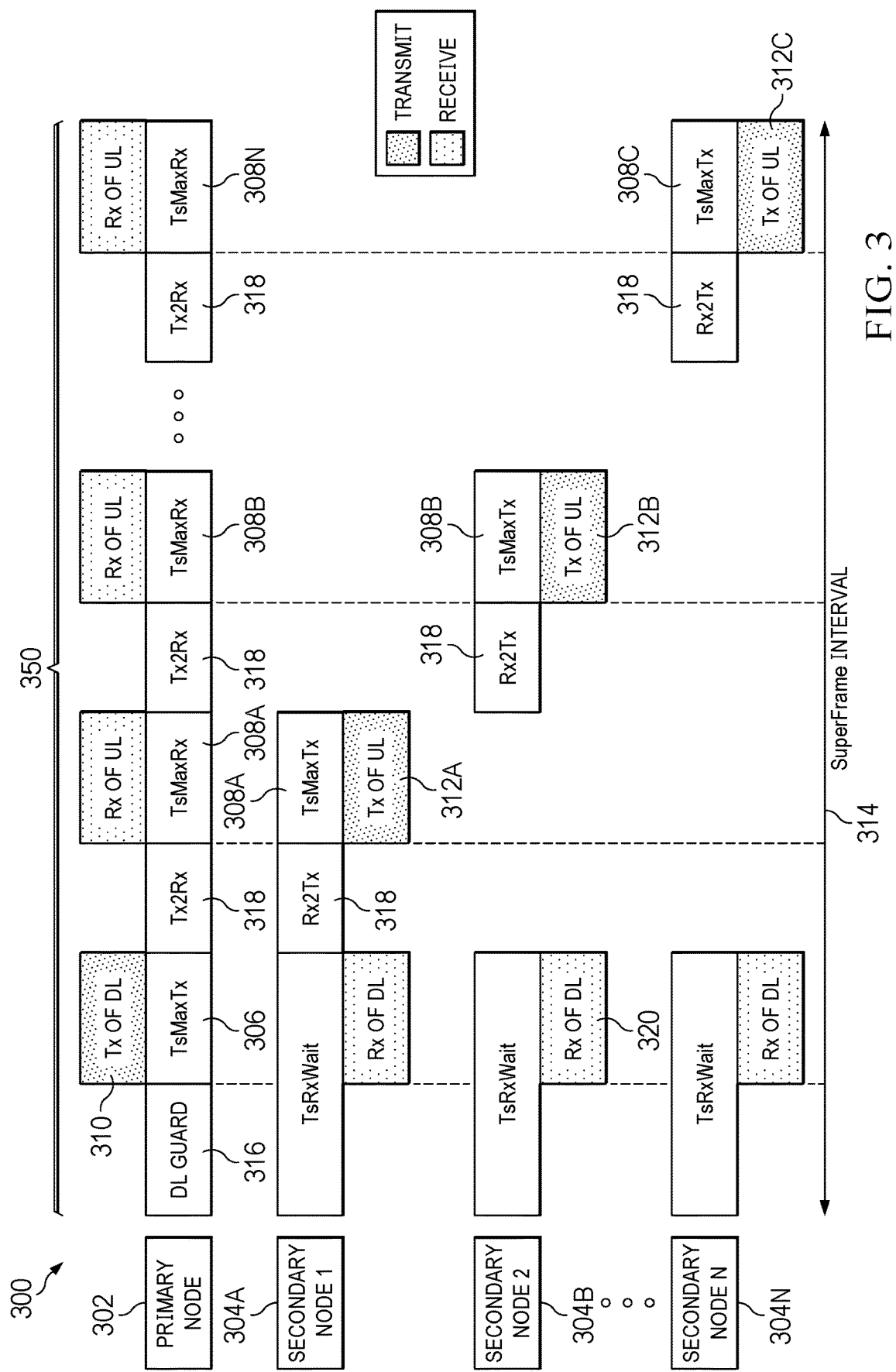
FIG. 3 is a frame diagram of a WBMS superframe, in accordance with aspects of the present disclosure.

FIG. 3 is a frame diagram 300 of a WBMS superframe 350, in accordance with aspects of the present disclosure. Along with channel sizing, the WBMS protocol further defines how communications between nodes may be performed. A WBMS network is directed by a primary node 302 which coordinates communications as between a set of N secondary nodes 304A, 304B, . . . 304N (collectively 304). The primary node 302 coordinates communications for the WBMS network by defining communication intervals and allocating these intervals using a superframe 350 consisting of a downlink allocation 306 for the primary node 302 and uplink allocations 308A, 308B, . . . 308N (collectively 308) for secondary nodes 304A, 3046, . . . 304N of the set of secondary nodes 304. In this example, the superframe 350 also includes a guard interval 316 prior to the downlink transmission 310, along with switching intervals 318 to provide time for the nodes to switch between a receiving mode to a transmitting mode, or vice versa. A superframe interval 314 is an amount of time to complete all transmission for the superframe 350, including the guard interval 316, and the superframe interval 314 may vary from WBMS network to WBMS network based on a number of secondary nodes 304 in the WBMS network.

The primary node 302 transmits 310, during the downlink allocation 306 to the secondary nodes 304, allocation information about the uplink allocations 308 for the secondary nodes 304. This allocation information may include a set of channels that may be used for the WBMS network along with a per-secondary node uplink allocation indicating when the respective secondary node 304A, 304B, . . . 304N may transmit 312A, 3126, . . . 312N to the primary node 302. In some cases, the allocation information may include additional information such as an acknowledgement for uplink transmissions from a previous superframe, an indication when a next superframe may begin, an adaptive frequency hopping countdown, an indication, such as a bitmap, of the channels of the WMBS protocol that may be used, etc. In some cases, each secondary node 304 connected to the primary node 302 is provided an uplink allocation 308 to transmit information about the battery cells associated with the respective secondary node 304. The primary node 302 may retransmit the allocation information one or more times, for example, to provide time diversity and to allow the secondary nodes 304 to measure the transmission from the primary node 302. The downlink transmission (including retransmissions, if any) from the primary node 302 is completed within the downlink allocation 306, but the downlink transmission does not need to take up the entire downlink allocation 306.

The secondary nodes 304 gather information about the battery cells and/or modules and wirelessly transmits 312 this information to the primary node 302 during the uplink intervals 308. For example, secondary node 2 304B attempts to receive 320 the downlink transmission 310 from the primary node 302 during the downlink allocation 306. In some cases, the secondary nodes 304 may determine the downlink allocation 306 time based on an indication from a previous superframe. Of note, the uplink transmissions 312 (an retransmissions, if any) by the secondary nodes 304 are completed within their respective uplink allocations 308, but the uplink transmissions also do not need to take up the entire uplink allocations 308.

After receiving 320 the downlink transmission 310, the secondary node 304B may parse the allocation information received from the primary node 302 to determine timing information for the uplink allocation 308B allocated to the secondary node 304B. In some cases, information for how to locate the timing information associated with a specific secondary node, such as secondary node 304B, from the allocation information may be exchanged during a WBMS network formation process.

As the frequency bands used by the WBMS network may be unlicensed, the wireless battery management protocol may need to share the frequency band with other wireless networks, such as 802.11, Bluetooth, or even other wireless battery management protocols. This sharing of the frequency band can result in interference between the wireless battery management protocol and other wireless networks.

Figure 4:
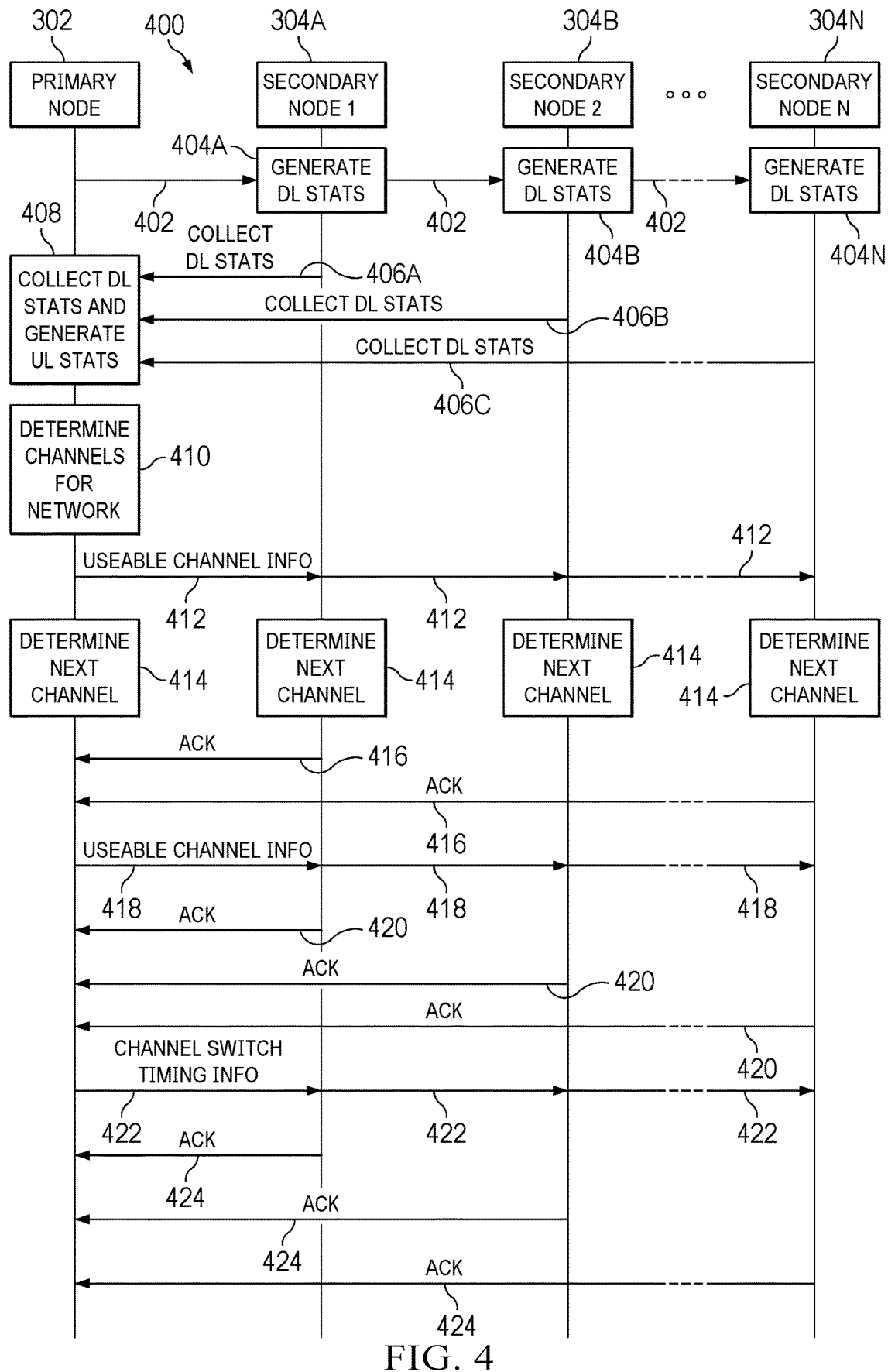
FIG. 4 is a diagram illustrating a technique for adaptive frequency hopping, in accordance with aspects of the present disclosure.

FIG. 4 is a diagram 400 illustrating a technique for adaptive frequency hopping, in accordance with aspects of the present disclosure. Adaptive frequency hopping attempts to avoid interference by dynamically switching wireless channels used by the wireless battery management protocol. However, randomly switching wireless channels may not be helpful as the randomly selected wireless channel may also experience interference. To help determine which wireless channels may be good candidates to switch to for adaptive frequency hopping, statistics about the wireless medium may be used to avoid such interference.

As shown in diagram 400, the primary node 302 transmits 402 downlink allocation information to the secondary nodes 304. In addition to receiving the downlink transmission 402, the secondary nodes 304 may also generate statistics 404A, 404B, . . . 404N about the downlink transmission 402. For example, the secondary node 2 304B may generate statistics 404B about the downlink transmission 402 by making packet error rate measurements, retransmission rate measurements, and/or signal-to-noise ratio measurements based on downlink transmissions 402 from the primary node 302. It may be understood that uplink and downlink transmissions shown in this example may include one or more retransmissions.

As an example, the secondary node 2 304B may measure a packet error rate based on a number of packets successfully received from the primary node 302 for the downlink transmission 402. In some cases, the secondary node 2 304B may also sample the wireless medium, for example, to listen for transmission on other channels of the frequency band that may be used by other wireless networks. These generated downlink statistics may be reported by the secondary node 2 304B along with information about the battery cells/modules to the primary node 302 during an uplink transmission 406B from the secondary node 2 304B to the primary node 302 during a corresponding uplink allocation. The primary node 302 may collect the downlink statistics 408 from all of the secondary nodes 304 and measure, for example, an overall packet error rate from the downlink transmission. The primary node 302 may also make packet error rate measurements, retransmission rate measurements, and/or signal-to-noise ratio measurements for the uplink transmissions 406 received from the secondary nodes 304 to generate uplink statistics 408, such as an overall uplink packet error rate. The primary node 302 may also sample the wireless medium, for example, to listen for transmission on other channels of the frequency band that may be used by other wireless networks. These statistics, for both the uplink and downlink, may be collected during each superframe interval.

Based on the uplink statistics, downlink statistics, and sampling the wireless medium, the primary node 302 determines 410 which channels of the WBMS protocol may be used for wireless communications by the WBMS network. For example, the primary mode 302 may determine that channels with a higher packet error rate, either uplink or downlink, than a threshold packet error rate may not be used for wireless communications by the WBMS network due to, for example, interference by another wireless network. In some cases, the channel determination 410 may be made over a time period of T length. In some cases, this time period may be defined, for example, by a manufacturer of the battery pack. The primary node 302 may create a bitmap of the channels of the WBMS protocol with an indication as to whether a channel is useable (e.g., available) or not useable by the WBMS network. For example, the primary node 302 may create a 40 cell array where each cell represents a channel of the WBMS protocol and each cell may have a value of 1 or 0 indicating whether that channel can be used by the WBMS network. In some cases, a bitmap of the channels may be smaller (e.g., has a fewer number of bits) as compared to an indication of a next channel. This is especially the case if multiple next channels are being selected (e.g., where secondary nodes can use different channels).

This indication of the channels that may be used by the WBMS network may be used to select a next channel. For example, the primary node 302 may transmit 412 the indication of the useable channels to the secondary nodes 304 as a part of a downlink transmission along with the downlink allocation information. Of note, the primary node 302 does not transmit an indication of the next channel the WBMS network is hopping to. Rather, the secondary nodes 304 and the primary node 302 determines 414 the next channel based on the indicated useable channels along with an identifier. The determination 414 may be performed using an algorithm available to each node. For example, the algorithm may be stored on a non-transitory computer readable storage medium. As an example, the algorithm may be a hashing algorithm that takes an identifier and a set of numbers (e.g., numbers represent the available channels) and outputs a number identifying the next channel from the set of numbers. Each node executes this algorithm to select the next channel.

In some cases, this identifier may be an identifier of the primary node 302. In other cases, another identifier, such as an identifier of the secondary node 304 may be used. The identifier may be exchanged as between the primary node 302 and secondary nodes 304, for example, during a WBMS network formation process. In some cases, a single channel is used by nodes of the WBMS channel and all nodes of the WBMS network switch to a single next channel. In other cases, nodes may transmit on different channels and each node may select a next channel independent of other nodes. For example, the nodes may select a next channel based on the indication of the useable channels and the identifier of the node. In some cases where multiple channels are used, more than one node may select the same channel. In such cases, time diversity may be used to avoid cross-interference between multiple nodes on the same channel.

After determining 414 the next channel, the secondary nodes 304 may acknowledge 416 receiving the downlink transmission 412 during their next downlink transmission in their respective downlink allocation. This acknowledgment 416 indicates to the primary node 402 that the next channel was successfully determined by the secondary nodes 304. In some cases, not every secondary node 304 may successfully receive the uplink, determine the next channel, and/or transmit an acknowledge back to the primary node 302 in the first superframe interval. In this example, no acknowledgement 416 uplink transmission is received from secondary node 2 304B. In such cases, the primary node 402 may make another downlink transmission 418 with the indication of the useable channels in another superframe interval to the secondary nodes 304. After all of the secondary nodes 304 have acknowledged 420 (either during a single superframe interval or over multiple superframe intervals) the uplink transmission with indication of the useable channels, the primary node 402 may transmit a downlink signal 422 including channel switching timing information. The channel switching timing information indicates to the secondary nodes 304 when to switch to the next channel. For example, the channel switching timing information may indicate a number of superframes (e.g., frames) or superframe intervals before the secondary nodes 304 should switch to the next channel. In some cases, downlink signal 422 including the channel switching timing information may force the secondary nodes 304 to transmit a response/acknowledgment in an uplink allocation of that superframe interval, even if the secondary node does not have any other information to transmit to the primary node 302. Forcing the secondary nodes 304 to acknowledge 424 the channel switching timing information helps ensure that the secondary nodes 304 will switch channels at the appropriate time. This downlink signal 422 including the channel switching timing information and corresponding uplink transmissions 424 from the secondary nodes 304 may be repeated in each superframe interval until the time to switch to the next channel is reached. Once the time to switch is reached, the primary node 302 and secondary nodes 304 switch to the next channel and a new superframe interval begins.

Figure 5:
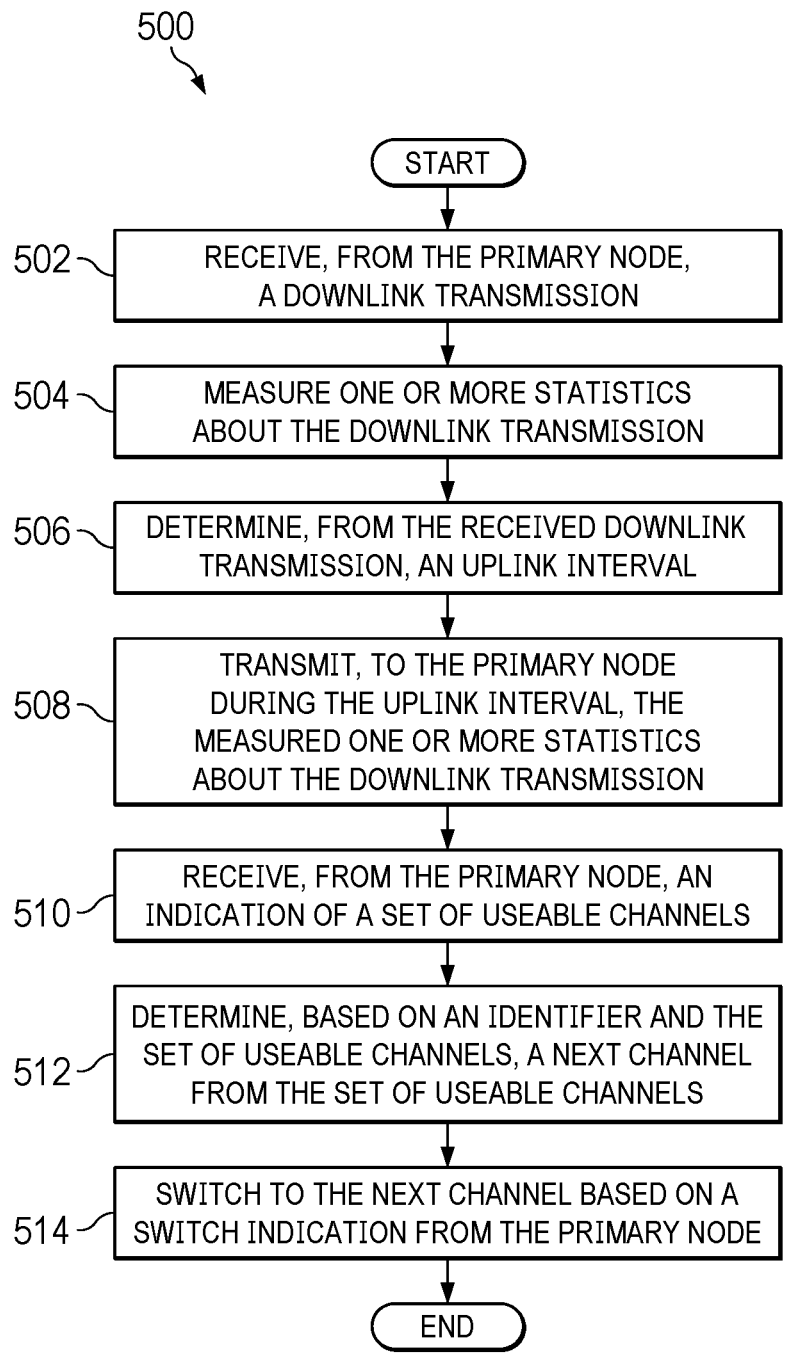
FIG. 5 is a flow diagram illustrating an example channel switching technique by a secondary node.

FIG. 5 is a flow diagram 500 illustrating an example channel switching technique by a secondary node. At block 502, the secondary node receives, from the primary node, a downlink transmission. For example, the secondary node, of a set of secondary nodes, may be wirelessly connected to a primary node and the primary node may transmit a downlink message to the secondary nodes via a current wireless channel. In some cases, the downlink transmission and uplink transmissions may be repeated one or more times. At block 504, the secondary node measures the one or more statistics about the downlink transmission. For example, the secondary node may measure a packet error rate of the downlink transmission. At block 506, the secondary node determines, from the received downlink transmission, an uplink interval. For example, the downlink message may include uplink allocations for the secondary nodes where the secondary nodes may transmit uplink messages to the primary node in the current wireless channel. The secondary node may parse the downlink message to determine the uplink allocation for the secondary node. At block 508, the secondary node transmits, to the primary node during the uplink interval, the measured one or more statistics about the downlink transmission. For example, the secondary node may implicitly acknowledge reception of the downlink message by transmitting a response in the uplink allocation. This response may include the measured statistics for the downlink transmission. The response may also include data regarding one or more battery cells associated with the secondary node.

At block 510, the secondary node receives, from the primary node, an indication of a set of useable channels. For example, the primary node may determine, based on the statistics received from the secondary nodes, a set of channels that are available for use (e.g., channels experiencing relatively lower interference and/or not being used by another wireless network) by the wireless network. In some cases, the primary node may also sense the wireless medium (e.g., detect the occurrence of other wireless transmission on the wireless medium) and information from this sensing may also be used to determine the set of channels available for use. The primary node may transmit this indication of the set of useable channels in another downlink transmission and this downlink transmission may also include uplink allocations for the secondary nodes. This downlink transmission is in a frame separate from another frame which included the downlink transmission discussed in block 502. In some cases, the indication of the set of useable channels may be a binary bitmap where the values of the bitmap indicate whether a channel, of the channels available in accordance with the wireless network protocol, is available for use by the wireless network.

At block 512, the secondary node determines, based on an identifier and the set of useable channels, a next channel from the set of useable channels. For example, the secondary node may use a predefined algorithm to determine a next channel, from the set of useable channels, to switch to from the current channel based on the identifier and the set of useable channels. In some cases, this algorithm may be a hashing algorithm. The identifier may be, for example, an identifier for the primary node, an identifier for the secondary node, both the identifier for the primary node and the identifier for the secondary node, or another identifier. In some cases, the secondary node may transmit an acknowledgment to the primary node indicating that the secondary node has determined the next channel in an uplink transmission.

At block 514, the secondary node switches to the next channel based on a switch indication from the primary node. For example, the secondary node switches to the next channel, as determined in block 512. In some cases, the secondary node may also receive, from the primary node, the switch indication. This switch indication is received in a separate frame from the frame with having the indication of the set of useable frames. The secondary node may, in response to the received switch indication, transmit an acknowledgement of the switch indication. The primary node may, after receiving acknowledgments from each of the secondary nodes, transmit channel switching timing information to the secondary nodes in another frame. The secondary node may receive this channel switching timing information and switch to the next channel based on the channel switching timing information.

Figure 6:
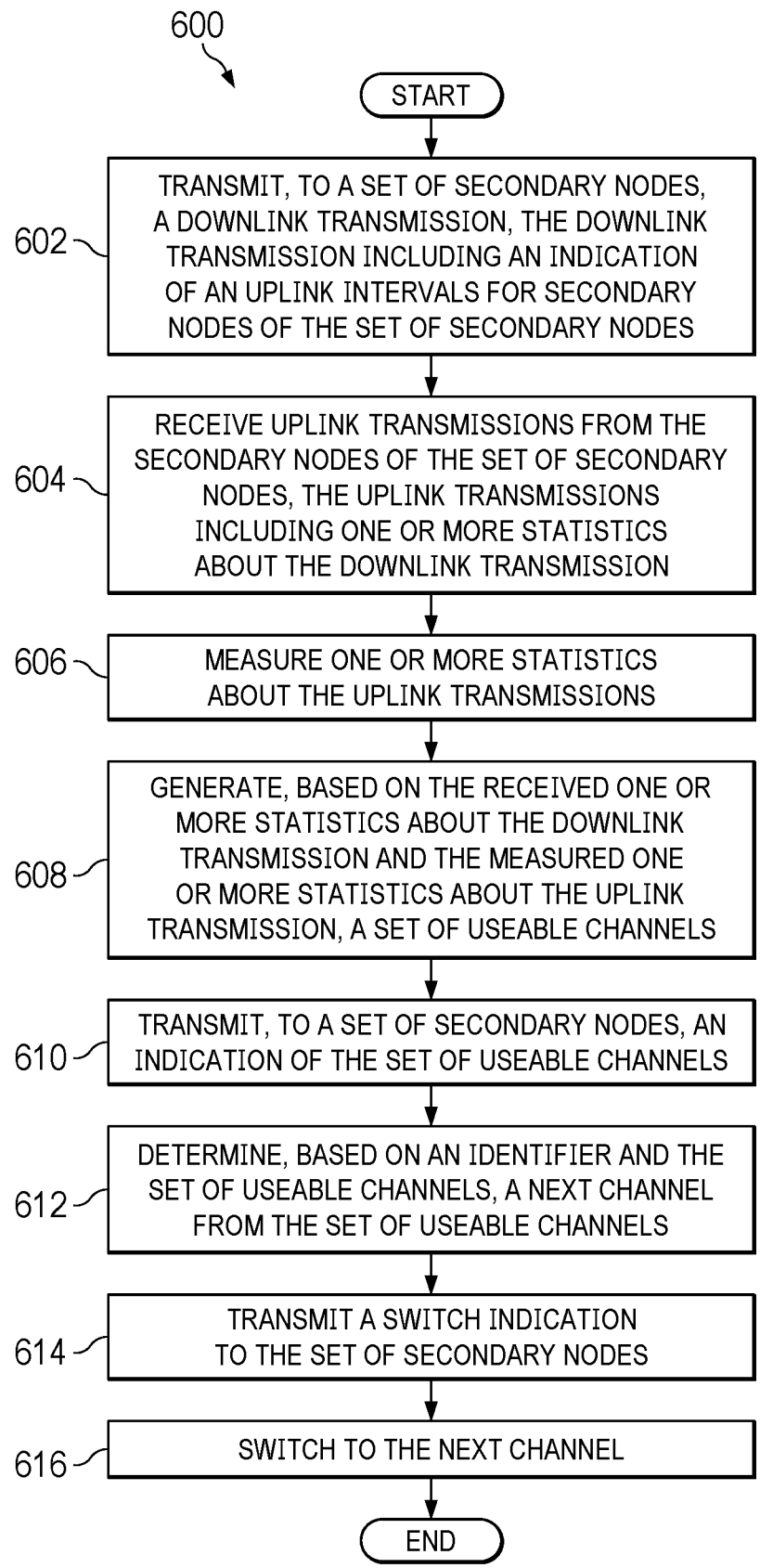
FIG. 6 is a flow diagram illustrating an example channel switching technique by a primary node.

FIG. 6 is a flow diagram 600 illustrating an example channel switching technique by a primary node. At block 602, the primary node transmits, to a set of secondary nodes, a downlink transmission, the downlink transmission including an indication of an uplink intervals for secondary nodes of the set of secondary nodes. For example, the primary node may be wirelessly connected to a set of secondary nodes and the primary node may transmit a downlink message to the secondary nodes via a current wireless channel. At block 604, the primary node receives uplink transmissions from the secondary nodes of the set of secondary nodes, the uplink transmissions including one or more statistics about the downlink transmission. For example, the secondary nodes may measure a packet error rate of the downlink transmission and transmit this measured packet error rate back to the primary node in an uplink transmission. At block 606, the primary node measures one or more statistics about the uplink transmissions. For example, the primary node may measure a packet error rate of the uplink transmissions received from the secondary nodes.

At block 608, the primary node generates, based on the received one or more statistics about the downlink transmission and the measured one or more statistics about the uplink transmission, a set of useable channels. For example, the primary node may combine the statistics received from the secondary nodes as an indication of a channel quality of the downlink transmission and the primary node may combine the statistics measured for the uplink transmission as an indication of the channel quality of the uplink transmission. based on this information, the primary node may determine a set of useable channels (e.g., available for use). In some cases, the primary node may also sense (e.g., detect other transmissions) the wireless medium and information from this sensing may also be used to determine the set of channels available for use. In some cases, the indication of the set of useable channels may be a binary bitmap where the values of the bitmap indicate whether a channel, of the channels available in accordance with the wireless network protocol, is available for use by the wireless network.

At block 610, the primary node transmits, to a set of secondary nodes, an indication of the set of useable channels. The primary node may transmit this indication of the set of useable channels in another downlink transmission and this downlink transmission may also include uplink allocations for the secondary nodes. At block 612, the primary node determines, based on an identifier and the set of useable channels, a next channel from the set of useable channels. For example, the primary node may use a predefined algorithm to determine the next channel, from the set of useable channels, to switch to from the current channel based on the identifier and the set of useable channels. In some cases, this algorithm may be a hashing algorithm. The identifier may be, for example, an identifier for the primary node, identifiers for the secondary nodes, both the identifier for the primary node and the identifiers for the secondary nodes, or another identifier.

At block 614, the primary node transmits a switch indication to the set of secondary nodes. This switch indication is received in a separate frame from the frame with having the indication of the set of useable frames. The secondary nodes may, in response to the received switch indication, transmit an acknowledgement of the switch indication. The primary node may, after receiving the acknowledgments from each of the secondary nodes, transmit channel switching timing information to the secondary nodes in another frame. The secondary node may receive this channel switching timing information and switch to the next channel based on the channel switching timing information. In some cases, the primary node may determine that the acknowledgment to the transmitted switch indication has not been received from each secondary node of the set of secondary nodes. In response to the determination that the acknowledgment to the transmitted switch indication has not been received from each secondary node, the primary node may transmit the indication of the set of useable channels to a set of secondary nodes and attempt to receive acknowledgments, from secondary nodes of the set of secondary nodes, to the transmitted switch indication until the acknowledgment to the transmitted switch indication has been received from each secondary node of the set of secondary nodes.

At block 616, the primary node switches to the next channel. For example, the secondary node switches to the next channel, as determined in block 612.

Figure 7:
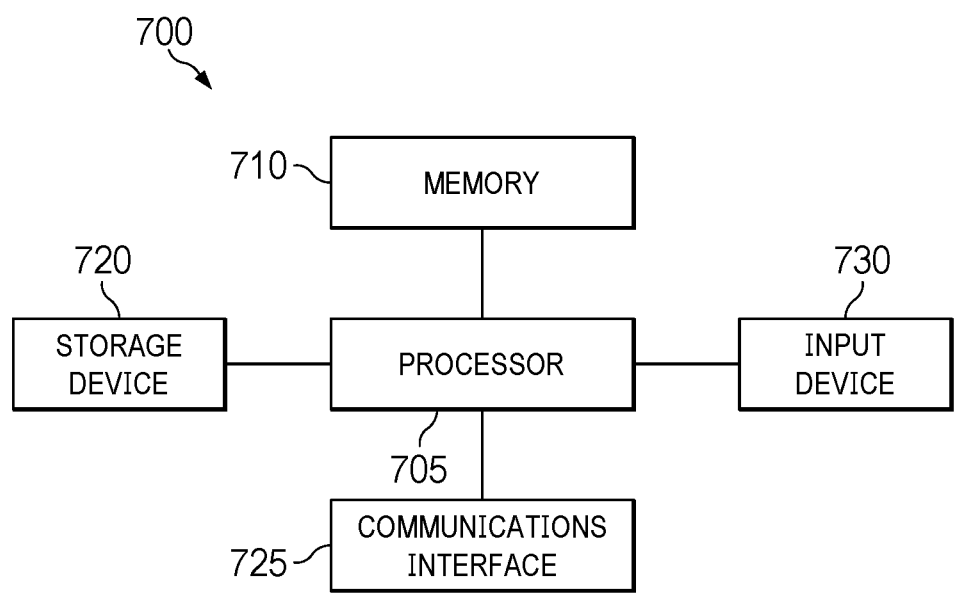
FIG. 7 is a block diagram of an example a computing device, in accordance with aspects of the present disclosure.

As illustrated in FIG. 7, device 700 includes processing circuitry, such as processor 705 that contains one or more hardware processors, where each hardware processor may have a single or multiple processor cores. Examples of processors include, but are not limited to, a central processing unit (CPU), image processor, microcontroller (MCU) microprocessor (MPU), digital signal processor (DSP), a field-programmable gate array (FPGA), an application-specific integrated circuit (ASIC), etc. Although not illustrated in FIG. 7, the processing circuitry that makes up processor 705 may also include one or more other types of hardware processing components, such as graphics processing units (GPUs), application specific integrated circuits (ASICs), field-programmable gate arrays (FPGAs), and/or digital signal processors (DSPs). In certain cases, processor 705 may be configured to perform the tasks described in conjunction with the technique described in FIGS. 5-6. In some cases, device 700 may be a primary node or a secondary node.

FIG. 7 illustrates that memory 710 may be operatively and communicatively coupled to processor 705. Memory 710 may be a non-transitory computer readable storage medium configured to store various types of data. For example, memory 710 may include one or more volatile devices, such as random-access memory (RAM), registers, etc. Non-volatile storage devices 720 can include one or more disk drives, optical drives, solid-state drives (SSDs), tap drives, flash memory, electrically erasable programmable read-only memory (EEPROM), and/or any other type memory designed to maintain data for a duration of time after a power loss or shut down operation. The non-volatile storage devices 720 may also be used to store programs that are loaded into the RAM when such programs are executed. In some cases, programs stored in the non-volatile storage device 720 may be executed directly from the non-volatile storage device 720. An input device 730 also may be included (e.g., a network interface, a sensor, etc.).

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g. data stored by a storage device 720, may be accessed by processor 705 during the execution of computer executable instructions or process steps to instruct one or more components within the computing device 700. Storage device 720 may be partitioned or split into multiple sections that may be accessed by different software programs. For example, storage device 720 may include a section designated for specific purposes, such as storing program instructions or data for updating software of the computing device 700. In one embodiment, the software to be updated includes the ROM, or firmware, of the computing device. In certain cases, the computing device 700 may include multiple operating systems. For example, the computing device 700 may include a general-purpose operating system that is utilized for normal operations. The computing device 700 may also include another operating system, such as a boot-loader, for performing specific tasks, such as upgrading and recovering the general-purpose operating system and allowing access to the computing device 700 at a level generally not available through the general-purpose operating system. Both the general-purpose operating system and another operating system may have access to the section of storage device 720 designated for specific purposes.

The one or more communications interfaces 725 may include a radio communications interface for interfacing with one or more radio communications devices. In certain cases, elements coupled to the processor may be included on hardware shared with the processor. For example, the communications interfaces 725, storage device 720, and memory 710 may be included along with other elements, such as the digital radio, in a single chip or package, such as in a system on a chip (SOC). Computing device 700 may also include input and/or output devices not shown, examples of which include sensors, cameras, human input devices, such as mouse, keyboard, touchscreen, monitors, display screen, tactile or motion generators, speakers, lights, etc. Processed input, for example from the image sensor, may be output from the computing device 700 via the communications interfaces 725 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method for channel switching by a secondary node, comprising:
   receiving, from a primary node, a downlink transmission;
   measuring one or more statistics about the downlink transmission;
   determining, from the downlink transmission, an uplink interval;
   transmitting, to the primary node during the uplink interval, the measured one or more statistics about the downlink transmission;
   receiving, from the primary node, an indication of a set of useable channels;
   determining, based on the set of useable channels and at least one of the primary node or the secondary node, a next channel from the set of useable channels; and
   switching to the next channel based on a switch indication from the primary node.

2. The method of claim 1, wherein determining the next channel is based on the set of useable channels and is further based on an identifier of the primary node.

3. The method of claim 1, further comprising:
   receiving the switch indication from the primary node;
   transmitting, in response to the received switch indication, an acknowledgment;
   receiving, from the primary node, a channel switch timing information; and
   switching to the next channel based on the channel switch timing information.

4. The method of claim 3, wherein the channel switch timing information is received in response to received acknowledgments from each secondary node of a set of secondary nodes.

5. The method of claim 3, wherein the channel switch timing information indicates a number of frames before switching.

6. The method of claim 1, wherein the one or more statistics comprises as least a packet error rate measurement.

7. The method of claim 1, wherein the indication of the set of useable channels comprises a bitmap.

8. A non-transitory program storage device comprising instructions stored thereon to cause one or more processors of a primary node to:
   transmit, to a set of secondary nodes, a downlink transmission, the downlink transmission including an indication of an uplink intervals for secondary nodes of the set of secondary nodes;
   receive uplink transmissions from the secondary nodes of the set of secondary nodes, the uplink transmissions including one or more statistics about the downlink transmission;
   measure one or more statistics about the uplink transmissions;
   generate, based on the one or more statistics about the downlink transmission and the measured one or more statistics about the uplink transmission, a set of useable channels;
   transmit, to the set of secondary nodes, an indication of the set of useable channels;
   determine, based on an identifier and the set of useable channels, a next channel from the set of useable channels;
   transmit a switch indication to the set of secondary nodes; and
   switch to the next channel.

9. The non-transitory program storage device of claim 8, wherein the identifier comprises an identifier of the primary node.

10. The non-transitory program storage device of claim 8, wherein the instructions further cause the one or more processors to:

receive acknowledgments, from secondary nodes of the set of secondary nodes, to the transmitted switch indication;

determine that an acknowledgment to the transmitted switch indication has been received from each secondary node of the set of secondary nodes; and transmit channel switch timing information based on the determination that the acknowledgment to the transmitted switch indication has been received from each secondary node.

11. The non-transitory program storage device of claim 10, wherein the instructions further cause the one or more processors to:

determine that the acknowledgment to the transmitted switch indication has not been received from each secondary node of the set of secondary nodes; and in response to the determination that the acknowledgment to the transmitted switch indication has not been received from each secondary node:

transmit the indication of the set of useable channels to the set of secondary nodes; and receive the acknowledgments, from secondary nodes of the set of secondary nodes, to the transmitted switch indication until the acknowledgment to the transmitted switch indication has been received from each secondary node of the set of secondary nodes.

12. The non-transitory program storage device of claim 10, wherein the channel switch timing information indicates a number of frames before switching.

13. The non-transitory program storage device of claim 8, wherein the one or more statistics about the uplink transmissions comprises as least a packet error rate measurement.

14. The non-transitory program storage device of claim 8, wherein the indication of the set of useable channels comprises a bitmap.

15. A system for channel switching by a wireless network comprising:

a plurality of secondary nodes; and a primary node wirelessly coupled to the plurality of secondary nodes, the primary node configured to:

transmit, to the plurality of secondary nodes, a downlink transmission, the downlink transmission including an indication of an uplink intervals for secondary nodes of the plurality of secondary nodes;

receive uplink transmissions from the plurality of secondary nodes, the uplink transmissions including one or more statistics about the downlink transmission;

measure one or more statistics about the uplink transmissions;

generate, based on the one or more statistics about the downlink transmission and the measured one or more statistics about the uplink transmission, a set of useable channels;

transmit, to the plurality of secondary nodes, an indication of the set of useable channels;

determine, based on an identifier and the set of useable channels, a next channel from the set of useable channels;

transmit a switch indication to the plurality of secondary nodes; and switch to the next channel; and wherein each secondary node of the plurality of secondary nodes is configured to:

receive, from the primary node, the downlink transmission;

measure the one or more statistics about the downlink transmission;

determine, from the received downlink transmission, an uplink interval;

transmit, to the primary node during the uplink interval, the measured one or more statistics about the downlink transmission;

receive, from the primary node, an indication of a set of useable channels;

determine, based on the identifier and the set of useable channels, the next channel from the set of useable channels; and switch to the next channel based on a switch indication from the primary node.

16. The system of claim 15, wherein the identifier comprises an identifier of the primary node.

17. The system of claim 15, wherein the one or more statistics about the uplink transmissions comprises as least a packet error rate measurement.

18. The system of claim 15, wherein the indication of the set of useable channels comprises a bitmap.

19. The system of claim 15, wherein the primary node is further configured to:

receive acknowledgments, from secondary nodes of the plurality of secondary nodes, to the transmitted switch indication;

determine that an acknowledgment to the transmitted switch indication has been received from each secondary node of the plurality of secondary nodes; and transmit channel switch timing information based on the determination that the acknowledgment to the transmitted switch indication has been received from each secondary node of the plurality of secondary nodes.

20. The system of claim 15, wherein the identifier comprises an identifier of at least one of the secondary nodes.

* * * * *